United States Patent [19]

Trujillo

[11] 4,034,488
[45] July 12, 1977

[54] APPARATUS FOR DEMONSTRATING THE TRAVEL OF HEAVENLY BODIES

[76] Inventor: Samuel E. Trujillo, 4300 Otis St., Wheat Ridge, Colo. 80033

[21] Appl. No.: 611,140

[22] Filed: Sept. 8, 1975

[51] Int. Cl.² .................................... G09B 27/02
[52] U.S. Cl. ............................... 35/45; 35/47
[58] Field of Search ......... 35/17, 19 R, 19 A, 24 C, 35/42.5, 45, 47; 40/106.21, 106.3

[56] References Cited

U.S. PATENT DOCUMENTS

| | | | |
|---|---|---|---|
| 1,261,809 | 4/1918 | Heaton | 35/45 |
| 1,872,074 | 8/1932 | De Witt | 40/106.21 |
| 3,005,270 | 10/1961 | Musser | 35/45 |
| 3,029,528 | 4/1962 | Verson | 35/45 |
| 3,089,259 | 5/1963 | Miller | 35/45 |
| 3,209,470 | 10/1965 | Plumb | 35/19 R |
| 3,242,595 | 3/1966 | Eastman | 35/45 |
| 3,255,539 | 6/1966 | Musser | 35/45 |
| 3,286,374 | 11/1966 | Baynes | 35/45 |
| 3,521,384 | 7/1970 | Holland | 35/45 |
| 3,704,528 | 12/1972 | Lewis | 35/17 |
| 3,713,229 | 1/1973 | Thomsen | 35/24 C |
| 3,733,720 | 5/1973 | Byers | 35/45 |
| 3,753,300 | 8/1973 | Mosley | 35/45 X |

Primary Examiner—Richard J. Apley
Attorney, Agent, or Firm—Gary M. Polumbus

[57] ABSTRACT

An apparatus is disclosed for demonstrating the movement of heavenly objects as they pass through the universe. The path a heavenly object follows is depicted three dimensionally by means of a hollow transparent tube molded in the shape of the path and containing a fluid supporting a floating sphere representing the heavenly object. By changing the fluid level in the tube the movement of the heavenly object through the universe is demonstrated.

5 Claims, 7 Drawing Figures

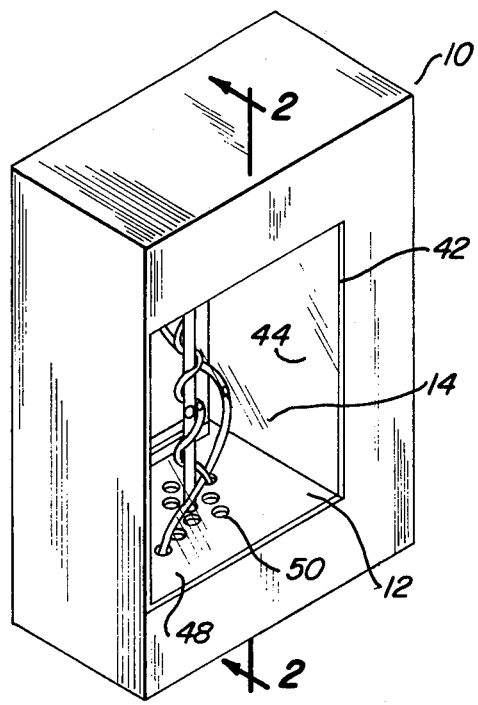
Fig _ 1
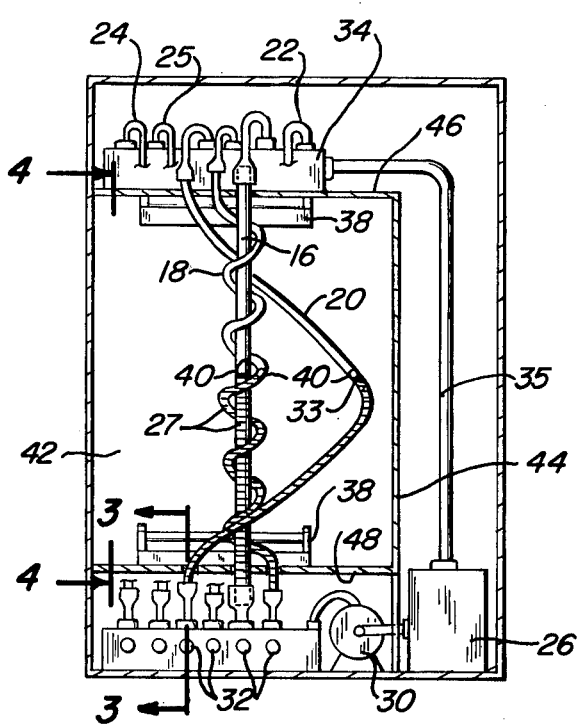
Fig _ 2
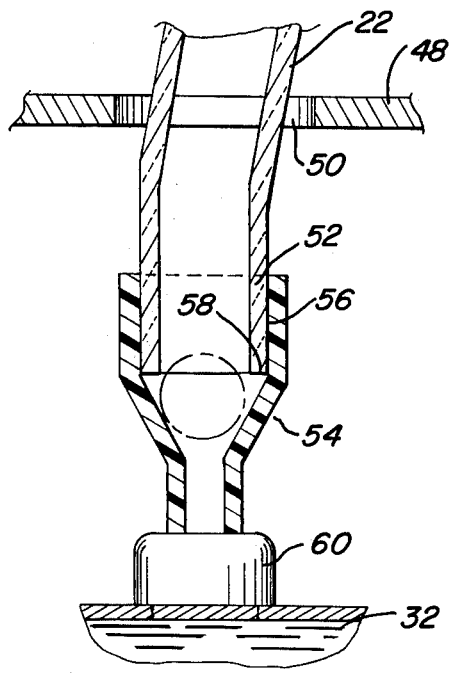
Fig _ 3

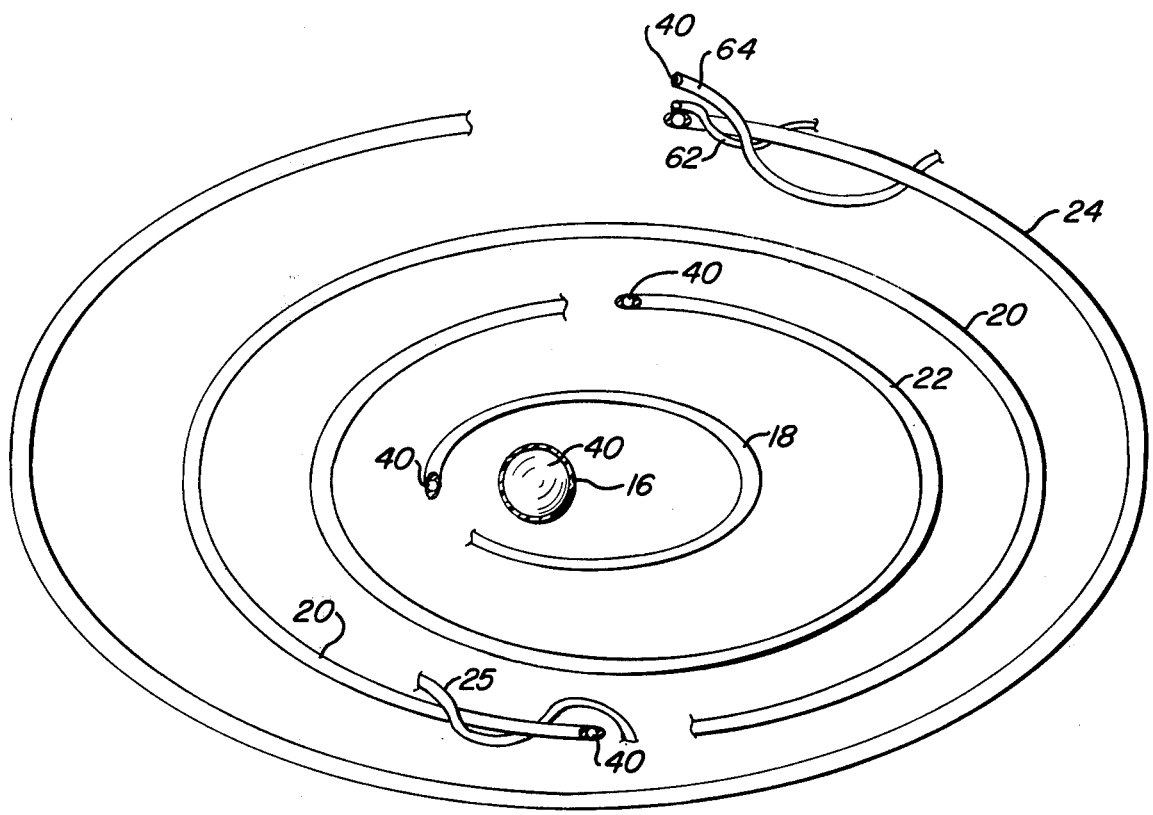
Fig _ 7
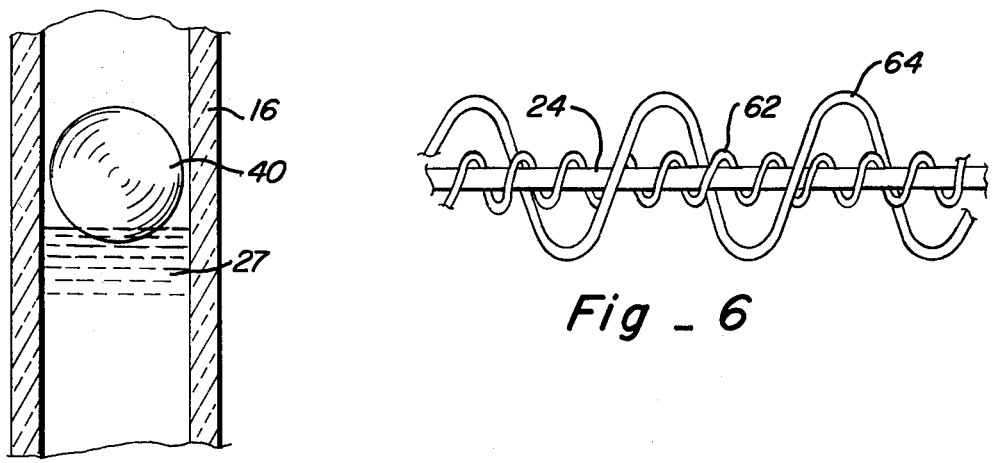
Fig _ 5
Fig _ 6

4,034,488

APPARATUS FOR DEMONSTRATING THE TRAVEL OF HEAVENLY BODIES

BACKGROUND OF THE INVENTION

1. Field of the Invention

This invention relates to apparatus for demonstrating the movement of heavenly objects through the universe.

2. Description of the Prior Art

It is common practice to provide an astronomical display system based on the Copernicus theory of the universe. Copernican Planetariums are the most familiar example of this theory which illustrate how the planets of the solar system traverse in circular motions about a stationary Sun. Such planetariums also show the moons of the planets, on a much smaller scale, traversing the same type of circular motion around their corresponding planets.

The Copernican approach is 473 years old and is misleading. Observers of such a demonstration obtain the misconceived concept that the Sun is fixed in space. On the contrary, the Sun has been determined to be moving at a velocity of 12 miles per second towards a point on the star sphere situated in the constellation Lyra not far from the first magnitude star Vega.

In addition, the planets do not move in a circular path about the Sun, but rather they move in ellipsoidal paths with the Sun comprising one of the focal centers of each ellipse. Thus, each planet occupies a perihelion point along the major axis of the ellipse which is the point closest to the Sun, and a point of maximum distance on the major axis, the aphelion point. This ellipsoidal orbit is the orbit that most heavenly objects take when in motion around another heavenly object.

As the Sun, therefore, moves towards Vega, the entire ensemble of planets also move towards Vega and the paths the planets take resemble the configuration of an ellipsoidal spiral staircase.

OBJECTS OF THE INVENTION

It is an object of the present invention to provide an apparatus for demonstrating the three dimensional movement of heavenly objects through the universe.

It is another object of the present invention to provide an apparatus that is adaptable to demonstrate the movement of the planets and moons of our solar system as the Sun travels through the universe.

It is another object of the present invention to provide an apparatus for demonstrating the three dimensional travel of the moons around the planets in spiral ellipsoidal orbits, the planets around the Sun in spiral ellipsoidal orbits, and the movement of the Sun pulling the ensemble of planets and moons through the universe.

It is another object of the present invention to provide an apparatus for demonstrating, in corresponding scale, the speed, velocity and relationship of the moons, the planets, and the Sun to each other in a three dimensional display.

It is another object of the present invention to provide an apparatus for demonstrating the travel of the solar system through the Universe comprising a plurality of spiral ellipsoidal shaped transparent tubes configured to represent the orbits of the planets around a long linear shaped tube representative of the Sun's path positioned at the foci of the ellipses of the tubes, fluids disposed in the tubes for supporting bodies disposed therein wherein each body is configured to represent a body of the solar system, and means for controlling the rate of ascent and descent of the fluid in the tubes.

SUMMARY OF THE INVENTION

Prior art apparatus for demonstrating the movement of heavenly objects through the universe are less than ideal since they are generally based on the Copernican concept which creates the misconception that a central object is fixed in space and that the satellites thereof move about the object in a circular fashion (i.e., the Sun and the planets).

The apparatus of the present invention demonstrates the movement of heavenly objects through the universe, and in particular, the movement of the planets and moons about the Sun wherein the Sun itself travels through space carrying with it the ensemble of planets moving in spiral ellipsodial orbits. The movement of the Sun is represented by moving a spheroidal body suspended on a fluid in a long, straight, rigid and transparent tube wherein the length of the tube represents a simulated distance that the sun will travel during a given time period. Around the tube representing the Sun's path, are assembled various coiled tubes, also transparent, containing spheroidal bodies representing the various planets. In addition, smaller coiled tubes representing the pathways of the moons which orbit around some of the various planets are arranged around the tube pathways of those planets.

In accordance with the invention, the coiled tubes depicting the planetary pathways, are arranged such that the spheroidal planets suspended therein traverse in spiral ellipsoidal paths around the focal center of the ellipse which the Sun's pathway intersects. The speeds that the planets and their moons circle the Sun in the apparatus are proportionate to the actual speeds that the real planets and moons circle the Sun.

BRIEF DESCRIPTION OF THE DRAWINGS

FIG. 1 is a perspective view depicting the apparatus for demonstrating planetary movement configured in accordance with one illustrated embodiment of the invention;

FIG. 2 is a front sectional view of the demonstrating apparatus of FIG. 1;

FIG. 3 is an enlarged sectional view taken along line 3—3 of FIG. 2 disclosing a portion of the transparent tube pathway connected to the source of the supply fluid;

FIG. 5 is an enlarged fragmentary vertical section taken along line 5—5 of FIG. 4 showing the Sun within the transparent tube which depicts the path of the Sun;

FIG. 6 is an enlarged fragmentary view of a portion of the transparent tubes depicting the motion of the moons around the planet Mars; and FIG. 7 is a sectional view taken along line 7—7 of FIG. 4 showing the ellipsoidal paths which the planets follow.

GENERAL DESCRIPTION

Figure 4:
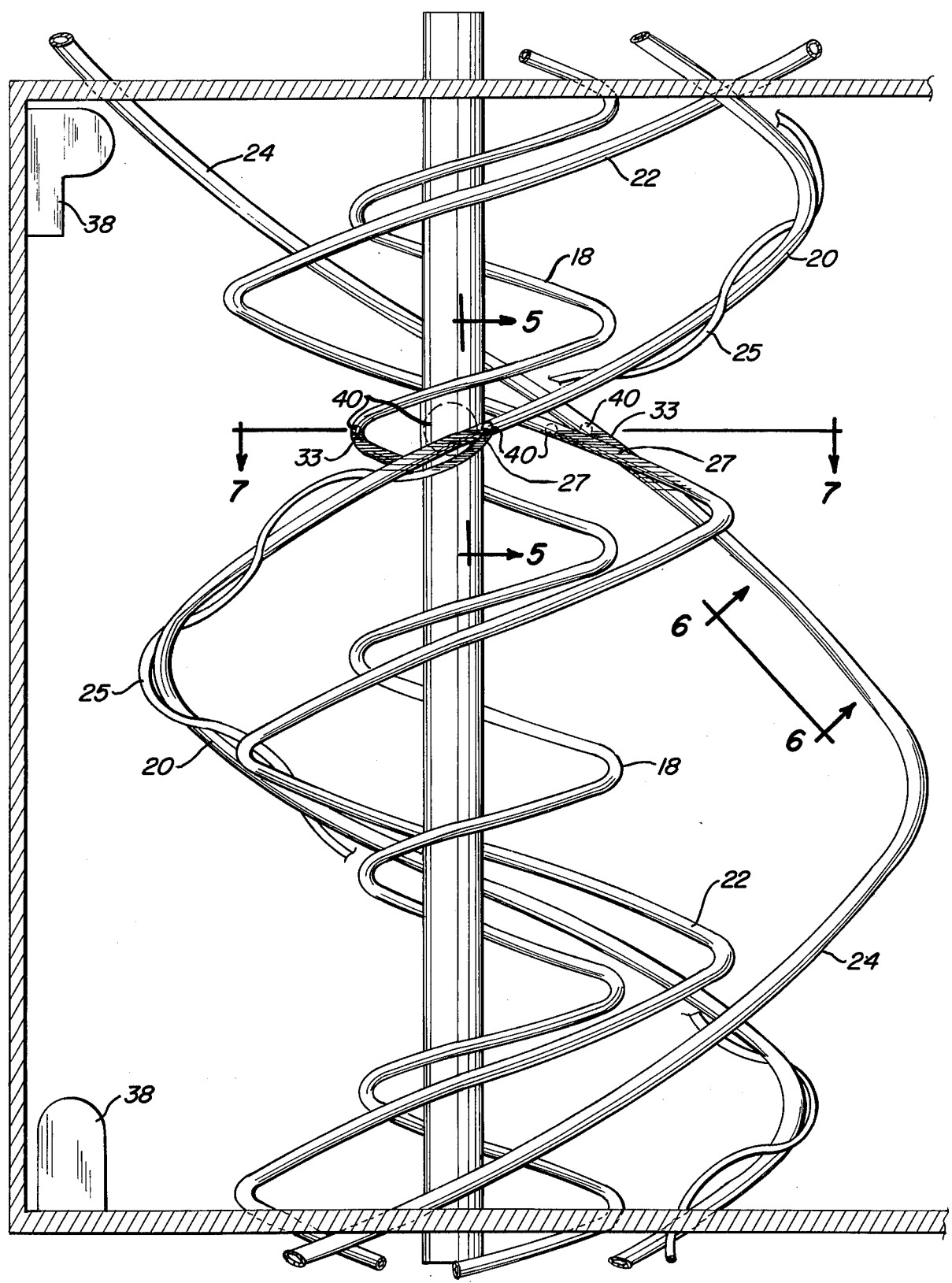
FIG. 4 is an enlarged sectional view taken along line 4—4 of FIG. 2 showing the relationship of the coiled pathways.

FIG. 1 is a perspective view of a preferred embodiment of the present invention depicting an outer enclosure 10, a transparent window 12 and the three dimensional apparatus 14 for depicting solar system travel.

In an effort to simplify the description as much as possible consistent with the full disclosure of the invention, only four planets are illustrated: Mercury, Venus, Earth and Mars. Moreover, only the Moon orbiting the earth and the two moons, Phobos and Deimos, orbiting Mars are illustrated in the drawings. However, an actual apparatus demonstrating the relationship of all nine planets to the Sun, and their respective moons would be included in such a demonstrative apparatus. A typical apparatus 10 of the present invention may vary in size from 10 to 40 vertical feet in a comparably sized room or may be housed in a rectangular box 4 feet by 6 feet.

The relationship of the planets and the Sun in FIG. 1 is described only to the extent that a full understanding of the invention can be realized. For a more comprehensive understanding of the relationship of the moons to the planets, and the planets to the Sun, as they travel through the universe, reference can be made to numerous text books on the subject.

DETAILED DESCRIPTION

FIG. 2 illustrates the transparent tube pathways for the Sun 16, Mercury 18 and Earth 20 only. The tube pathways for Venus 22, Mars 24 and the Earth's moon 25 are provided, but the pathways are cutaway to aid in clarity of understanding.

FIG. 2 illustrates the basic elements of the present invention to include: a reservoir 26 containing fluid 27, a pump 30 to pump the fluid from the reservoir 26 into the transparent tubes, regulatory valves 32 governing the amount of fluid 27 in each tube, the transparent tube pathways depicting the travel of the Sun and the planets upwardly and an overflow reservoir 34 wherein fluid 27 may be delivered through pipe 35 back into the primary reservoir 26 in case of overflow. Also, shown in FIG. 2 are ultraviolet lamps 38 for illuminating the spheroidal bodies 40 found within the tubes as will be subsequently discussed.

The demonstrative apparatus 14 is housed within a rectangular shell 42, situated within the housing 10 as depicted in FIG. 1, wherein the overflow reservoir 34, the primary reservoir 26, the pump 30 and the valve controls 32 are separated and hidden from the demonstrative apparatus by means of one side partition 44, a top partition 46 and a bottom partition 48. The top 46 and bottom 48 partitions have guide holes 50 corresponding to the intersection of the tube pathways at those points, as best shown in FIG. 1. It is to be understood, that shell 42 could easily be constructed, in a conventional fashion, of plywood or similar type material or be specially constructed into a large vertical room for large scale demonstration. The housing 10 and the shell 42, as mentioned, may be made of any suitable materials and may be constructed in any conventional manner.

It is to be further understood that the pumping fluid 27 from primary reservoir 26, through pump 30, the regulatory valves 32, and the tubing to specified levels in the tubing is conventional in the art of fluid design, and that the provision of a pump 30 with appropriate controls, not shown, to cause the level 33 of fluid 27 to rise from the regulatory valves 32 and then to lower level 33 downwardly to a point just above regulatory valves 32 in a cyclic recurring manner is also conventional in the art of fluid design.

The ultraviolet lamps 38 are positioned to the rear of the display 14 opposite transparent glass 12 and are positioned at the top 46 and the bottom 48 of shell 42 in order to expose the illuminous spheroidal balls 40 representing the Sun and the planets with a maximum amount of ultraviolet radiation. It is evident, that if the display apparatus 14 is positioned within the interior of a large room, that the positioning of the ultraviolet lamps would be arranged so that the maximum visual effect of the movement of the heavenly objects can be communicated to an observer.

FIG. 3 illustrates the detail of the bottom end 52 of the transparent tube 22 representing the pathway for the planet Venus as it extends through guide hole 50 of the bottom partition 48 of shell 42 into a connector 54. The transparent tube 22, in the present embodiment, consists of a cylindrical plastic tube molded in the spiral ellipsoidal pathway that Venus follows around the Sun. Bottom end 52 of tube 22 enters a connector 54 wherein the bottom end 52 is press-fitted into the inner diameter 56 of connector 54, best shown in FIG. 3. The connector 54 tapers inwardly from the point of the end 58 of the tube 22 downwardly so that the spheroidal ball 40 representing Venus cannot fall into the pumping system. Connector 54 engages a conventional fluid fitting 60 for connection into a conventional regulatory valve 32.

Connector 54 and regulatory valve 32 may comprise any of a number of commercially available devices and selection of an appropriate pump 30, regulatory valve 32 and fitting 60 would depend on the nature of the housing 10 as previously discussed.

FIG. 4 is a side view of the demonstrating apparatus 14 and illustrates the following planetary paths: Mercury 18, Venus 22, Earth 20 with the accompanying moon path 25, and the pathway of Mars 24. It is evident, that the diameter of each of these plastic tubes varies according to the scale size of the planet which they represent. Therefore, the diameter of the tube representing the pathway 18 of Mercury would be smaller than the diameter of the tube representing the pathway 20 of Earth. The pathway 25 of the moon, in the present invention, is a very narrow tube the diameter of which is much less than the diameter of the tube for the pathway 20 of Earth. The present embodiment as represented in the drawing contemplates a demonstrating apparatus 6 feet in height and using tubes and spheres having the following dimensions:

| Heavenly Object | Inside Dia of Tube (inches) | Outside Dia of Tube (inches) | Dia of Sphere (inches) |
|---|---|---|---|
| Sun | 1-3/4 | 2-1/8 | 1-1/2 |
| Mercury | 3/16 | 5/16 | 1/8 |
| Venus | 5/16 | 7/16 | 1/4 |
| Earth | 3/8 | 1/2 | 5/16 |
| Mars | 1/4 | 3/8 | 3/16 |

These coiled tube pathways are precisely molded so that the orbital diameters are comparable for illustration purposes to the actual spiral ellipsoidal orbits of the planets. Also, each tube is measured so that each coiled peak is equally distant from its next succeeding peak. It is obvious, that if the demonstrating apparatus is placed within a large vertical room the above dimensions would be greater.

It is also apparent, that the inner planets of Mercury 18 and Venus 22 have a greater frequency of repetition than the outer planets of Mars 24 and Earth 20. In fact, only one cycle of revolution for the planet Mars 24 is shown in FIG. 4 of the present embodiment.

Although the present invention does not contemplate the use of supporting apparatus for the various tube pathways for the planets, if a large enough display is used such support apparatus may have to be provided.

As mentioned, the orbits of heavenly objects around a major object are generally ellipsoidal and the major object occupies one of the foci of each ellipse. Orbits for heavenly objects, in general, may be of any eccentricity. Some are almost perfectly circular while others are extremely elongated ovals. Comets, for example, generally have elongated orbits approaching the parabolic or the hyperbolic shape. The latter geometric figures are classified as ellipses having generally infinite axises. Therefore, an object traveling along an elliptical orbit must at different positions find itself at different distances from the major object occupying one of the foci; it will be nearest the large body at one end of the axis and furthest from the major point at the opposite end of the axis. These two points are called perihelion and aphelion, respectively, in the case of the orbit of the planets around the Sun, as mentioned, and, in the case of the moon's orbit around the Earth, the respective designations become perigee and apogee. Each tube is precisely molded to conform to its planet's pathway around the Sun as the Sun corresponds on scale to the actual values found in the following table:

| Planet | Distance from Sun | |
|---|---|---|
| | Perihelion (million miles) | Aphelion (million miles) |
| Mercury | 28.75 | 43.75 |
| Venus | 66.7 | 67.7 |
| Earth | 91.2 | 94.6 |
| Mars | 128.75 | 155 |
| Jupiter | 459.8 | 506.8 |
| Saturn | 836 | 936 |
| Uranus | 1700 | 1866 |
| Neptune | 2792 | 2792 |
| Pluto | 2766 | 4566 |

FIG. 4 illustrates the level 33 of the fluid 27 to be at a horizontal plane approximately two-thirds up the vertical distance of the demonstrating apparatus 14. The spheres 40 representing the Sun and the various planets are disposed within this plane as represented in FIG. 7.

These relationships are shown in FIG. 7 for Mercury 18, Venus 22, Earth 20 and the moon 25, and Mars 24 and its two moons, Phobos 62 and Deimos 64. It is to be understood that demonstrating apparatus 14 could be enlarged to include Jupiter, Saturn, Uranus, Neptune and Pluto and their respective satellites.

FIG. 5 illustrates a sectional view of the interior of tube 16 for the Sun. The fluid 27 used in the present embodiment is mineral oil since it provides good buoyancy, is resistant to rust, and is transparent. However, any similar type of fluid may be utilized within the tubes.

The spheres 40 representing the heavenly objects are made of material that is capable of floating in fluid 27 for a substantial time period. For example, a ping pong ball is utilized in the present invention to represent the Sun 16 and is capable of floating for a substantial period in mineral oil. The planets are made of small spheres of plastic foam having the dimensions listed above. Each sphere 40 is coated with a phosphorus paint so that lights 38 cause them to be significantly illuminated.

It is to be noted, that the diameter of the sphere representing the heavenly object is less than the inside diameter of the tube so that the sphere 40 may freely pass within the interior of the tube especially along the curved bends.

FIG. 6 illustrates the details for the pathways of Phobos 62 and Deimos 64 around a portion of the tubular pathway for Mars 24. The orbits of these satellites while being elliptical are almost circular. Phobos has an orbit of 5,800 miles, and Deimos has an orbit of 14,600 miles.

It is evident, therefore, that the apparatus represents a new kind of planetarium wherein the Sun and planets of the Sun are depicted moving through space in spiral ellipsoidal orbits and wherein the Sun occupies the foci point of all such planetary orbits. In addition, the relative velocity of each of the heavenly objects in the solar system is represented since it is evident that the moon orbiting around the Earth as the Earth orbits around the sun is the fastest moving object in that relationship. Mercury moves faster than Venus, and the moons of Mars move at a greater velocity than Mars itself. Such velocity relationships are immediately recognizable upon observantion of this display.

The display 14 of FIG. 1 is protected from all light outside of it, except the viewer's window 12. The interior preferably is pitch dark in order to achieve the maximum display effect. The interior of inner shell 42, therefore, is preferably either painted black or covered with a black material. A variety of pin holes in the black paint or black material depicting various constellations or other stars can be added for greater realism.

In operation of the apparatus, the viewer does not see the tubular pathways or the mineral oil 27, but only sees the illuminated spheres 40. These illuminated spheres 40 in the actual demonstration will move from the bottom upwardly through the tubular pathways so that spheres 40 are substantially aligned in a horizontal plane as best shown in FIG. 4. The effect created, therefore, will be one wherein the Sun is moving through the universe in a substantially linear path carrying along with it the ensemble of planets.

It is apparent that numerous embodiments and arrangements, not only of the solar system, but of other heavenly objects and arrangements can be contrived utilizing the basic three dimensional concept and demonstrating apparatus of the present invention.

Although the present invention has been described with a certain degree of particularity, it is understood that the present disclosure has been made by way of example, and that changes in details of structure may be made without departing from the spirit thereof.

1. An apparatus for displaying the three-dimensional passage of the solar system through the universe, said solar system comprising the Sun and the planets, said apparatus comprising:

a plurality of bodies, each of said bodies representing a different heavenly object in said solar system, at least one spiral ellipsoidal shaped transparent tube, said spiral ellipsoidal tube being configured to represent the orbit of one of said planets and one of said bodies representing said planet being disposed therein, a linear shaped tube positioned at the foci of said spiral ellipsoidal tube, said linear shaped tube being configured to represent the path of said Sun and the body representing said Sun being disposed therein, fluid in said spiral ellipsoidal tube and said linear shaped tube for supporting the bodies disposed therein, and means for controlling the rate of ascent and descent of the fluid level in each of the tubes.

2. The apparatus of claim 1 wherein said bodies are lighter than said fluid so as to float on the surface of said fluid.

3. The apparatus of claim 1 wherein said controlling means comprises:

means for storing said fluid, means for pumping said fluid from said storing means, means for controlling the level of said fluid in said tube, and means for controlling the speed at which said fluid rises and falls in said tube.

4. The apparatus of claim 1 wherein said bodies are coated with an illuminous material so that said body can be made visible in a environment without visible light.

5. The apparatus of claim 1 wherein the inner diameters of said tubes are substantially equal to the diameter of the body disposed in the tube.

* * * * *